United States Patent
Iio et al.

(10) Patent No.: US 6,841,280 B2
(45) Date of Patent: Jan. 11, 2005

(54) FUEL CELL POWER PLANT

(75) Inventors: Masatoshi Iio, Yokohama (JP);
Yasukazu Iwasaki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 504 days.

(21) Appl. No.: 09/940,547

(22) Filed: Aug. 29, 2001

(65) Prior Publication Data
US 2003/0027024 A1 Feb. 6, 2003

(30) Foreign Application Priority Data
Sep. 11, 2000 (JP) ........................................ 2000-275190

(51) Int. Cl.⁷ ............................ H01M 8/06; H01M 8/04
(52) U.S. Cl. ........................................... 429/19; 429/25
(58) Field of Search ............................ 429/17, 19, 22, 429/25

(56) References Cited

U.S. PATENT DOCUMENTS
6,063,515 A * 5/2000 Epp et al. ................... 429/17

FOREIGN PATENT DOCUMENTS

| JP | 5-129029 | | 5/1993 |
|---|---|---|---|
| JP | 05-129029 | * | 5/1993 |
| JP | 7-302609 | | 11/1995 |
| JP | 11-116202 | * | 4/1999 |

* cited by examiner

Primary Examiner—Jonathan Crepeau

(57) ABSTRACT

The hydrogen permeating to a post-separation side (11B) of the membrane hydrogen separator (11) is supplied to an anode chamber (2A) of a fuel cell stack (2) via a hydrogen supply passage (25). A hydrogen recirculation passage (8) recirculates hydrogen from the anode chamber (2A) to the post-separation side (11B). When the hydrogen partial pressure on the post-separation side (11B) increases, air is introduced into the hydrogen recirculation passage (8) from an intake valve (30). When the hydrogen partial pressure decreases, gas in the hydrogen recirculation passage (8) is discharged from an exhaust valve (60). The rate of hydrogen permeation through the membrane hydrogen separator (11) is thereby maintained to a preferred level.

11 Claims, 5 Drawing Sheets

FUEL CELL POWER PLANT

FIELD OF THE INVENTION

This invention relates to a fuel cell power plant using a reformate gas processed by a reformer.

BACKGROUND OF THE INVENTION

Tokkai Hei 5-129029 published by the Japanese Patent Office in 1993 and Tokkai Hei 7-302609 published by the Japanese Patent Office in 1995 disclose a fuel cell power plant provided with a hydrogen recirculation passage. A reformate gas processed by the reformer is transformed into a hydrogen-rich gas as a result of permeating a membrane hydrogen separator and thereafter is supplied to an anode chamber of a fuel cell stack.

The anode effluent from the anode chamber is recirculated to the post-separation side of the membrane hydrogen separator through a hydrogen recirculation passage and is mixed with the hydrogen-rich gas which has permeated through the membrane hydrogen separator. Thereafter this gas is re-supplied to the anode chamber.

SUMMARY OF THE INVENTION

When a steam reformer is used as the reformer and has an operating pressure of 10.0 atm, the partial pressure exerted on the post-separation side of the membrane hydrogen separator by hydrogen takes a value of 1.93 atm when the total pressure on the post-separation side of the membrane hydrogen separator is 2.5 atm.

When a preferential catalytic oxidation (PROX) reactor or an autothermal (ATR) reactor which promote simultaneous preferential oxidation and steam reforming is used as the reformer, the operating pressure of the reformer is approximately 2.5 atm. In this case, the hydrogen partial pressure on the post-separation side of the membrane hydrogen separator is 1.95 atm, in contrast to the hydrogen partial pressure of 1.98 atm on the pre-separation side of the membrane hydrogen separator.

The hydrogen partial pressure on the pre-separation side of the membrane hydrogen separator must be increased in order to maintain a hydrogen permeation amount. Thus the air pressure of air entering the reformer must also be increased in order to increase the operating pressure. This has the result of a larger load being applied to a compressor which supplies air to the reformer and thus reduces the efficiency of the fuel cell system.

In this regard, Tokkai Hei 11-116202 published by the Japanese Patent Office in 1999 discloses a technique of supplying nitrogen or steam as a sweep gas to the post-separation side of the membrane hydrogen separator. The supply of the sweep gas causes a reduction in the hydrogen partial pressure on the post-separation side of the membrane hydrogen separator. Thus the difference in hydrogen partial pressures on the pre-separation side and post-separation side of the membrane hydrogen separator is increased and the hydrogen permeation amount through the membrane hydrogen separator is also increased.

However the efficiency of this type of fuel cell is reduced due to the energy used in generating the sweep gas. Furthermore when this fuel cell power plant is used to power a vehicle, limited space results in problems in disposing additional equipment such as a tank or a sweep gas generating device.

It is therefore an object of this invention to reduce the hydrogen partial pressure on the post-separation side of a membrane hydrogen separator through use of a sweep gas while minimizing additional equipment at the same time.

In order to achieve the above object, this invention provides a fuel cell power plant comprising a fuel cell stack comprising an anode chamber and a cathode chamber, a membrane hydrogen separator having a pre-separation side facing a reformate gas and a post-separation side, a hydrogen supply passage which supplies hydrogen at the post-separation side of the membrane hydrogen separator to the anode chamber, an anode effluent recirculation passage which recirculates anode effluent discharged from the anode chamber to the post-separation side of the membrane hydrogen separator, an intake valve which introduces a gas other than hydrogen to one of the anode effluent recirculation passage and the hydrogen supply passage; and a discharge valve which discharges gas from the anode effluent recirculation passage. The fuel cell stack generates power by a reaction of hydrogen supplied to the anode chamber and air supplied to the cathode chamber. The membrane hydrogen separator allows hydrogen in the reformate gas to permeate from the pre-separation side to the post-separation side.

The details as well as other features and advantages of this invention are set forth in the remainder of the specification and are shown in the accompanying drawings.

DESCRIPTION OF THE PREFERRED EMBODIMENTS

Figure 1:
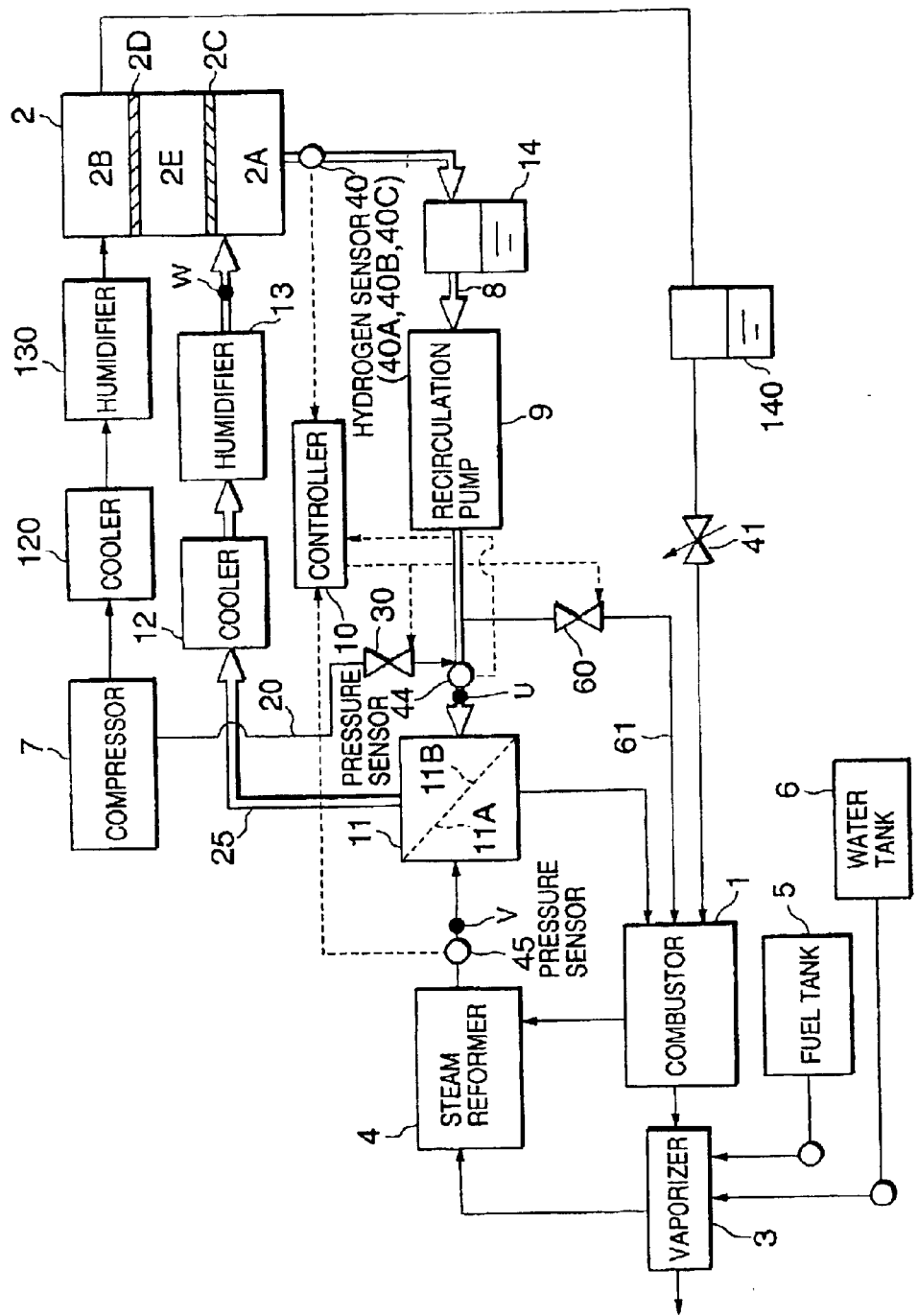
FIG. 1 is a schematic diagram of a fuel cell power plant for a vehicle according to this invention.

Referring to FIG. 1 of the drawings, the fuel cell power plant for a vehicle according to this invention is provided with a fuel cell stack 2. The fuel cell stack 2 comprises polymer electrolyte fuel cells (PEFC) which are laminated in parallel. Each cell comprises an anode 2C, a cathode 2D, an anode chamber 2A facing the anode 2C, a cathode chamber 2B facing the cathode 2D and a solid polymer electrolyte 2E disposed between the anode 2C and the cathode 2D.

The fuel cell power plant is provided with a steam reformer 4 and a membrane hydrogen separator 11. The steam reformer 4 generates a reformate gas containing hydrogen from a liquid fuel such as alcohol or gasoline.

The membrane hydrogen separator 11 comprises a pre-separation side 11A and a post-separation side 11B. A hydrogen-rich gas is generated on the post-separation side 11B by permeating the reformate gas introduced on the pre-separation side 11A through a membrane of the membrane hydrogen separator 11.

The hydrogen-rich gas permeating to the post-separation side 11B of the membrane hydrogen separator 11 is supplied to the anode chamber 2A of the fuel cell stack 2 from a hydrogen supply passage 25. A cooler 12 which cools the hydrogen-rich gas and a humidifier 13 which humidifies the hydrogen-rich gas are provided in the hydrogen supply passage 25.

Pressurized air from a compressor 7 is supplied through a cooler 120 and a humidifier 130 to the cathode chamber 2B of the fuel cell stack 2.

The fuel cell stack 2 separates hydrogen from the anode chamber 2A into a proton and an electron (H+) with a catalyst-mediated oxidation reaction. The proton passes through the solid polymer electrolyte 2E in the fuel cell stack 2 and reaches the cathode 2D. The electron passes from an electrode through a load circuit such as a motor and reaches the cathode 2D.

Protons and electrons reaching the cathode 2D react with oxygen in the cathode chamber 2D to produce water.

These reactions result in hydrogen-containing anode effluent being discharged from the anode chamber 2A and oxygen-containing cathode effluent being discharged from the cathode chamber 2B.

Anode effluent is recirculated to the post-separation side 11B of the membrane hydrogen separator 11 by an anode effluent recirculation passage 8. A water separator 14 and a recirculation pump 9 are provided in the anode effluent recirculation passage 8. The water separator 14 removes water from the anode effluent and maintains the moisture concentration in the anode effluent to the saturated state.

The anode effluent recirculation passage 8 recirculates a hydrogen-containing gas processed by the water separator 14 and pressurized by the recirculation pump 9 to the post-separation side 11B of the membrane hydrogen separator 11. The re-supplied gas is mixed with the hydrogen-rich gas generated by the membrane hydrogen separator 11 and is supplied again to the anode chamber 2A of the fuel cell stack 2.

The cathode effluent is supplied to a combustor 1 through a pressure control valve 41 after water is separated by a water separator 140.

The combustor 1 is provided in order to generate the heat required by a vaporizer 3 and the steam reformer 4. The combustor 1 generates heat by reacting gas containing hydrogen supplied from the anode effluent recirculation passage 8 through a discharge valve 60 and reformate gas generated by the steam reformer 4 with oxygen contained in the cathode effluent supplied through the pressure control valve 41.

A gaseous mixture of steam and liquid fuel such as alcohol or gasoline is supplied through the vaporizer to the steam reformer 4. The vaporizer 3 generates a gaseous mixture by vaporizing water from a water tank 6 and fuel from the fuel tank 5 with the high levels of heat created by combusted gas in the combustor 1. The gaseous mixture is supplied to the steam reformer 4. The steam reformer 4 performs a steam reformate using a catalyst and heat from the combustor 1 applied to the gaseous mixture in order to generate a reformate gas containing hydrogen ($H_2$).

A discharge passage 61 which supplies a part of the hydrogen-containing gas to the combustor 1 is connected to the anode effluent recirculation passage 8 through the discharge valve 60. An air supply passage 20 is connected through an intake valve 30 to the anode effluent recirculation passage 8.

The hydrogen separation capability of the membrane hydrogen separator 11 increases as the difference between the hydrogen partial pressure on the pre-separation side 11A and the hydrogen partial pressure on the post-separation side 11B increases. In this fuel cell power plant, part of the pressurized air from the compressor 7 is supplied to the post-separation side 11B of the membrane hydrogen separator 11 from the air supply passage 20 via the anode effluent recirculation passage 8. This air is supplied as a sweep gas in order to reduce the hydrogen partial pressure on the post-separation side 11B.

The fuel cell power plant is provided with a controller 10 for controlling the hydrogen pressure on the post-separation side 11B of the membrane hydrogen separator 11 through the operation of the intake valve 30 and discharge valve 60.

When the hydrogen concentration in the anode effluent recirculation passage 8 rises, the controller 10 opens the intake valve 30 and introduces air into the anode effluent recirculation passage 8. As a result, the hydrogen partial pressure on the post-separation side 11B of the membrane hydrogen separator 11 is reduced and the amount of hydrogen permeating from the pre-separation side 11A to the post-separation side 11B increases.

In order to maintain the amount of hydrogen supplied to the anode chamber 2A at a predetermined value, the amount of fuel supplied to the reformer 2A from the fuel tank 5 through the vaporizer 3 is reduced. Oxygen contained in the air supplied from the intake valve 30 to the anode effluent recirculation passage 8 creates steam as a result of oxidation reactions in the anode chamber 2A.

However, the moisture content in the gas in the anode effluent recirculation passage 8 is maintained constant by the water separator 14 as described above, so the air supplied to the anode effluent recirculation passage 8 substantially provides nitrogen and carbon dioxide contained in the air to the gas in the anode effluent recirculation passage 8.

As a result, the hydrogen concentration in the anode effluent recirculation passage 8 is reduced.

Until the discharge valve 60 is open, nitrogen and carbon dioxide are recirculated in the hydrogen supply passage 25 and the anode effluent recirculation passage 8. The intake valve 30 is closed when the hydrogen concentration in the anode effluent recirculation passage 8 is lowered to a predetermined concentration.

On the other hand, when the hydrogen concentration in the anode effluent recirculation passage 8 is lower than the predetermined concentration, the hydrogen pressure is also lower than a predetermined pressure.

In this case, the discharge valve 60 is opened, and part of the gas in the anode effluent recirculation passage 8 is discharged to the combustor 1. This operation allows nitrogen and carbon dioxide contained in the gas to be discharged from the anode effluent recirculation passage 8. Although hydrogen is also discharged at this time, the concentration of hydrogen in the anode effluent recirculation passage 8 rises because hydrogen is continuously supplied from the membrane hydrogen separator 11.

The fuel cell power plant is provided with a hydrogen sensor 40, a pressure sensor 44 and a pressure sensor 45 to provide the controller 10 with informations required for the above control. The hydrogen sensor 40 detects the hydrogen concentration in the gas in the anode effluent recirculation passage 8. The pressure sensor 44 detects the absolute pressure P2$a$ of the gas on the post-separation side 11B of the membrane hydrogen separator 11. The pressure sensor 45 detects the absolute pressure P1$a$ of the gas on the pre-separation side 11A of the membrane hydrogen separator 11. The controller 10 operates the intake valve 30 and the discharge valve 60 based on detection signals from these sensors in order to maintain the hydrogen partial pressure on the post-separation side 11B of the membrane hydrogen separator 11 at a target value.

The controller 10 comprises a microcomputer provided with a central processing unit (CPU), a read only memory (ROM), a random access memory (RAM) and an input/output interface (I/O interface), or plurality thereof.

Figure 2:
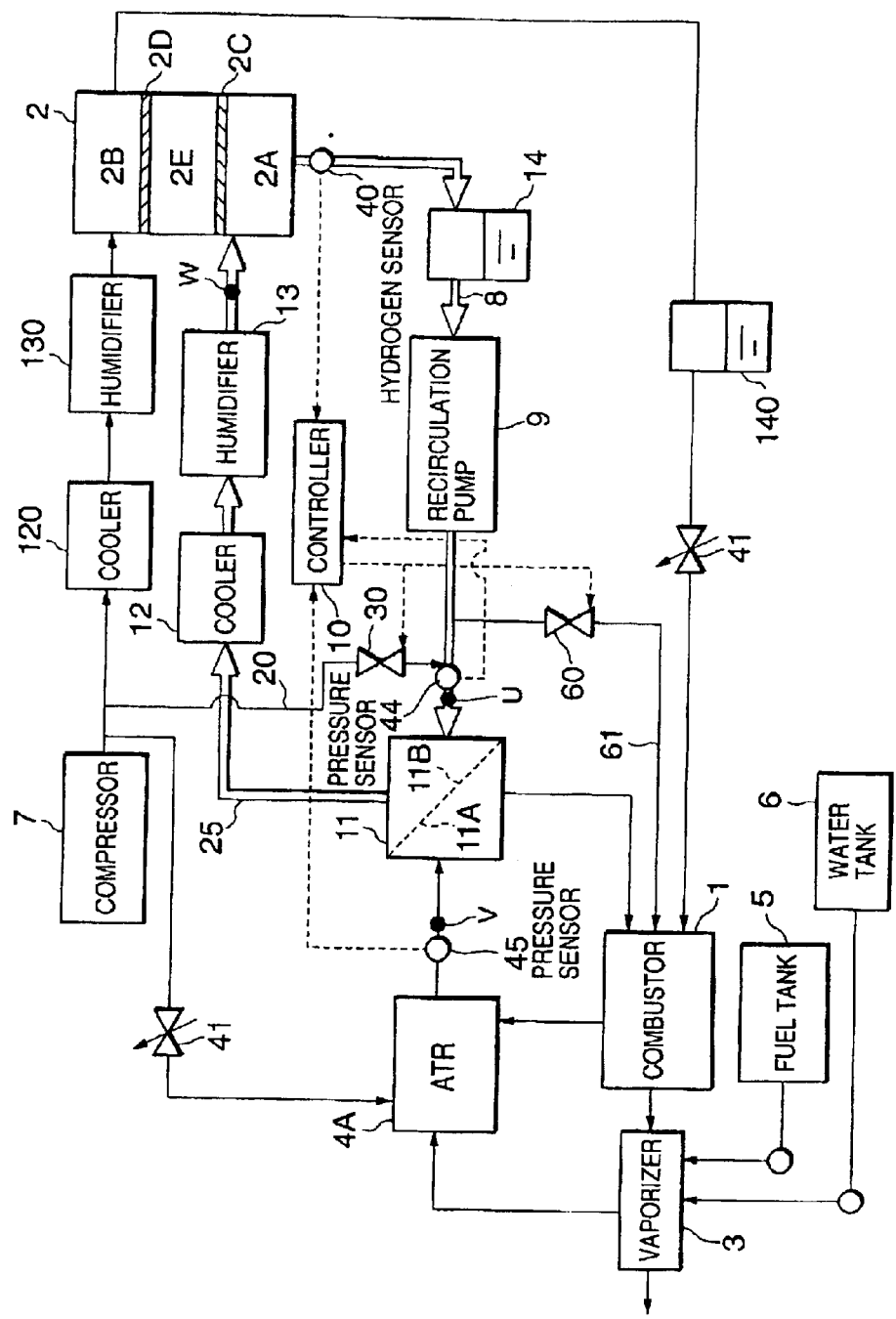
FIG. 2 is similar to FIG. 1, but showing a variation related to a reformer.

A second embodiment of this invention will be described below with reference to FIG. 2.

In this embodiment, the reformate gas is produced using an autothermal reactor (ATR) 4A instead of the steam reformer 4.

The ATR 4A reforms the fuel by partial oxidation with a catalyst. For this purpose, air is supplied through a valve 141 from the compressor 7 to the ATR 4A. Other structure is the same as that described with respect to the first embodiment.

The hydrogen partial pressure and the steam pressure at the point U, the point V and the point W in FIG. 1 in the first embodiment are shown in Table 1. The hydrogen partial pressure and the steam partial pressure at the point U, the point V and the point W in FIG. 2 in the second embodiment are shown in Table 2.

TABLE 1

(unit: atm)

| | POINT U | POINT V | POINT W |
|---|---|---|---|
| $H_2$ | 0.64 | 6.32 | 1.52 |
| $H_2O$ | 0.57 | 1.39 | 0.47 |
| Others | 1.29 | 2.29 | 0.51 |

TABLE 2

(unit: atm)

| | POINT U | POINT V | POINT W |
|---|---|---|---|
| $H_2$ | 0.64 | 1.98 | 1.52 |
| $H_2O$ | 0.57 | 0.27 | 0.47 |
| Others | 1.29 | 0.25 | 0.51 |

The conditions for calculation of the hydrogen partial pressure are the same as calculations using conventional techniques when a sweep gas is not used. In both the first embodiment which uses the steam reformer 4 and the second embodiment which uses an ATR 4A, the hydrogen partial pressure on the post-separation side 11B of the membrane hydrogen separator 11 measured at the point U reduces from 1.93 to 0.64.

The amount of hydrogen permeating the membrane hydrogen separator 11 is proportional to the difference of the square root of the hydrogen partial pressure on the pre-separation side 11A (point V) and the square root of the hydrogen pressure on the post-separation side 11B (point U).

The amount of hydrogen permeating the membrane hydrogen separator 11 in the first embodiment is given by the following equation.

$$\frac{\text{Hydrogen permeation amount according to 1st embodiment}}{\text{Hydrogen permeation amount without sweep gas}} = \frac{\sqrt{6.32} - \sqrt{0.64}}{\sqrt{6.32} - \sqrt{1.93}}$$

$$= 1.52$$

That is to say, this invention allows the hydrogen permeation amount to be increased by approximately 1.5 times when using the same membrane hydrogen separator 11. Therefore this allows the membrane hydrogen separator 11 to be downsized. When turning the fuel cell power plant ON or OFF, the membrane hydrogen separator 11 must be warmed or cooled. Furthermore it is necessary to remove hydrogen in the casing which houses the membrane hydrogen separator 11. The time required for these processes is shortened by downsizing the membrane hydrogen separator 11.

In the first and the second embodiments above, air is introduced into the anode effluent recirculation passage 8 in order to reduce the hydrogen partial pressure on the post-separation side 11B of the membrane hydrogen separator 11. However, it is possible to reduce the hydrogen partial pressure on the post-separation side 11B of the membrane hydrogen separator 11 by using a gas other than air, for example by using the combusted gases discharged from the vaporizer 3 or the cathode effluent from the cathode chamber 2B.

Figure 3:
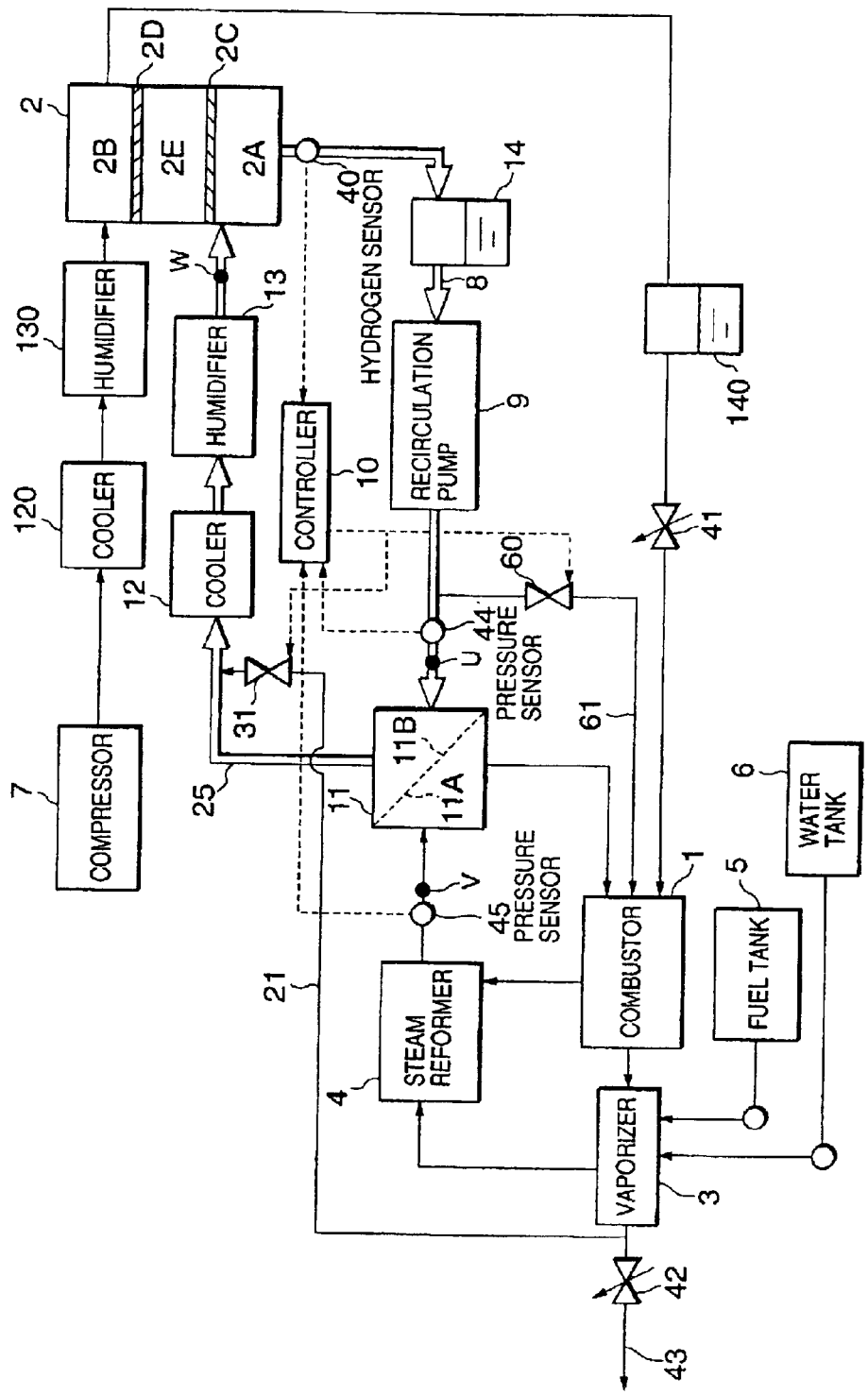
FIG. 3 is a schematic diagram of a fuel cell power plant for a vehicle according to a second embodiment of this invention.

Next, a third embodiment of this invention will be described with reference to FIG. 3.

In this embodiment, a combusted gas supply passage 21 and valves 31 and 42 are provided in order to supply combusted gas from the combustor 1 introduced into the vaporizer 3 to the hydrogen supply passage 25 instead of the intake valve 30 in the first embodiment. The valve 31 is provided in the combusted gas supply passage 21 and the valve 42 is provided in a discharge passage 43 which discharges combusted gas from the vaporizer 3 into the atmosphere. The valves 31 and 42 are operated by the controller 10.

When the hydrogen concentration in the anode effluent recirculation passage 8 rises, the controller 10 closes the valve 42, opens the valve 31 and supplies combusted gas from the combustor 1 to the hydrogen supply passage 25. The combusted gas is recirculated to the hydrogen supply passage 25 and the anode effluent recirculation passage 8 with the result that the hydrogen partial pressure on the post-separation side 11B of the membrane hydrogen separator 11 is reduced.

Further, the controller 10 reduce the fuel supply amount from the fuel tank 5 to the steam reformer 4 via the vaporizer 3 so as to avoid increasing in the hydrogen permeating amount of the membrane hydrogen separator 11. Thus in this embodiment, the combusted gas from the combustor 1 functions as a sweep gas. Instead of the combustion gas supply passage 21 and the valve 31, it is possible to supply a part of the pressurized air to the hydrogen supply passage 25 using the intake valve 30 and the compressor 7 in the same manner as the first embodiment.

This embodiment differs from the first and second embodiments in that gas for reducing the hydrogen partial pressure on the post-separation side 11B is introduced into the combusted gas supply passage 21 and not into the anode effluent recirculation passage 8. This has the following advantage.

That is to say, a membrane hydrogen separator 11 undergoes embrittlement in a low temperature range below a predetermined temperature. Thus the possibility exists that such embrittlement will be promoted by introducing low temperature gas into the anode effluent recirculation passage 8. Furthermore when gas is introduced into the hydrogen supply passage 25, the temperature of the gas is increased by the heat of reaction in the fuel cell as it passes through the fuel cell stack 2. In this embodiment, this has the desirable effect of preventing embrittlement in the membrane hydrogen separator 11 in comparison to the first and second embodiments.

Figure 4:
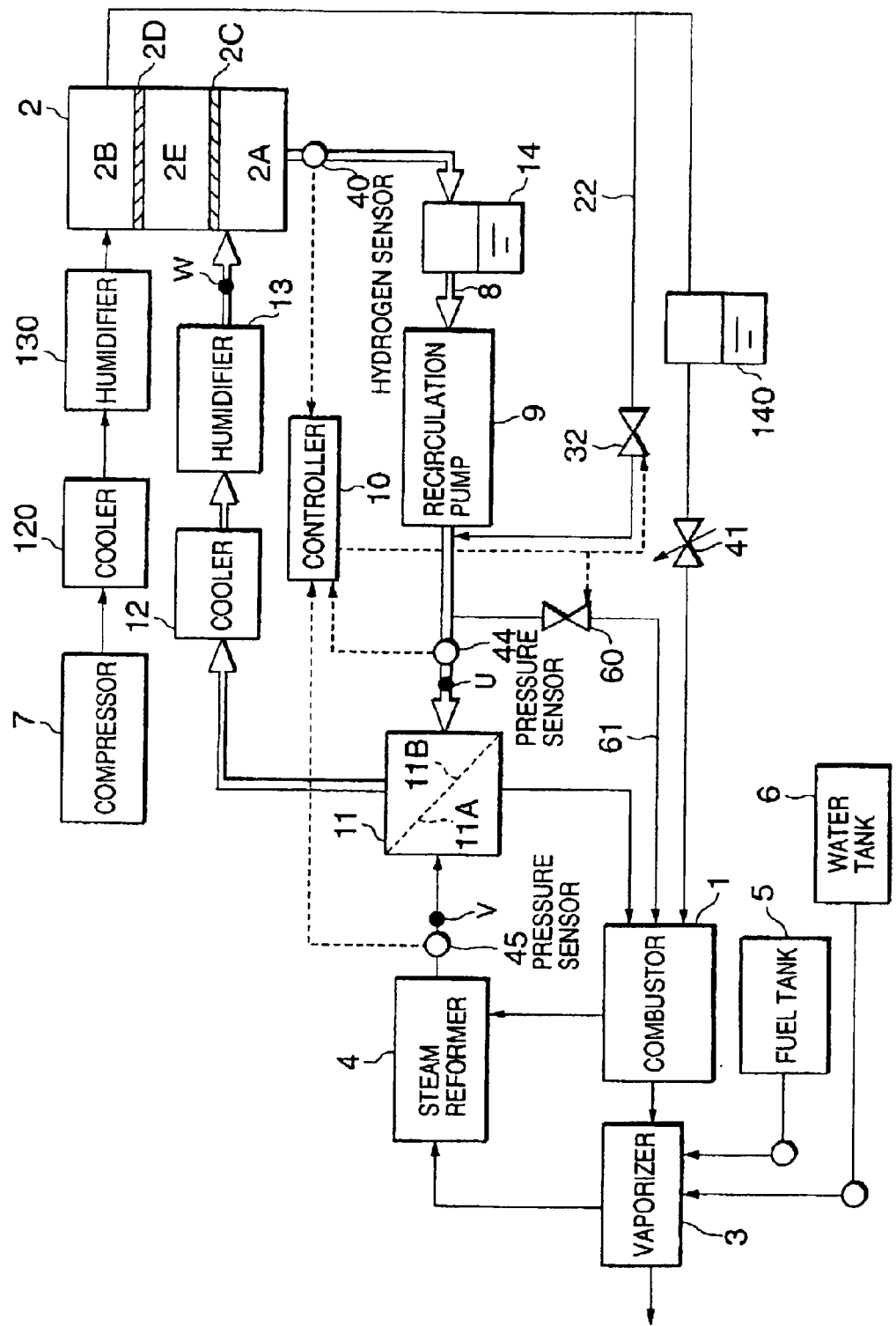
FIG. 4 is a schematic diagram of a fuel cell power plant for a vehicle according to a third embodiment of this invention.

Next, a fourth embodiment of this invention will be described with reference to FIG. 4.

According to this embodiment, instead of the intake valve 30 of the first embodiment, a valve 32 is provided which supplies a part of the cathode effluent discharged from the cathode chamber 2A of the fuel cell stack 2 to the anode effluent recirculation passage 8 through the passage 22. The valve 32 is operated by the controller 10.

When the hydrogen concentration in the anode effluent recirculation passage 8 rises, the controller 10 opens the valve 32 and supplies a part of the cathode effluent to the anode effluent recirculation passage 8. As a result, the hydrogen partial pressure on the post-separation side 11B of the membrane hydrogen separator 11 is reduced.

In the first embodiment, when the intake valve 30 is opened and air is introduced into the anode effluent recirculation passage 8 from the compressor 7, there is the possibility that the air amount supplied to the cathode chamber 2B of the fuel cell stack 2 will undergo fluctuations. In this embodiment, since the oxygen concentration of the sweep gas is regulated using cathode effluent of the cathode chamber 2B, it is possible to prevent fluctuation in the air amount supplied to the cathode chamber 2B by regulating the oxygen concentration in the sweep gas. Furthermore it is possible to promote further reductions in the hydrogen partial pressure on the post-separation side 11B of the membrane hydrogen separator 11 with the steam in the cathode effluent.

A fifth embodiment of this invention will be described below with reference to FIG. 5.

This embodiment is related to control of the hydrogen pressure on the post-separation side 11B of the membrane hydrogen separator 11 by the controller 10. The hardware composition of this embodiment is identical to that of the first embodiment.

First, an algorithm for detecting the hydrogen partial pressure on the post-separation side 11B will be described.

Components other than oxygen in air are nitrogen ($N_2$), carbon monoxide (CO) and carbon dioxide ($CO_2$). The ratio of these components is defined by the following equation.

$$N_2 : CO : CO_2 = X : Y : Z$$

These components on the post-separation side 11B of the membrane hydrogen separator 11 are recirculated through the anode effluent recirculation passage 8 and the hydrogen supply passage 25 and do not increase as long as the intake valve 30 and the discharge valve 60 are closed.

When the concentration of nitrogen (N2) in the gas in the passages 8 and 25 is taken to be A(%), the concentration of each component is expressed by the following equation.

$$N_2 : CO : CO_2 = A : \frac{A \cdot Y}{X} : \frac{A \cdot Z}{X}$$

The water separator 14 maintains steam on the post-separation side 11B of the membrane hydrogen separator 11 at a saturated steam pressure Ps. When the steam concentration on the post-separation side 11B of the membrane hydrogen separator 11 is taken to be B(%) and the absolute pressure P2a on the post-separation side 11B of the membrane hydrogen separator 11 is taken to be P2a, the steam concentration B(%) is expressed by the following equation.

$$B = \frac{Ps}{P2a} \cdot 100$$

Thus the hydrogen partial pressure P2h on the post-separation side 11B of the membrane hydrogen separator 11 is expressed by the following equation.

$$P2h = P2a \cdot \text{hydrogen concentration}$$
$$= P2a \cdot \left\{ 1 - \frac{\left( A + \frac{A \cdot Y}{X} + \frac{A \cdot Z}{X} + B \right)}{100} \right\}$$

When the hydrogen concentration and the absolute pressure P2a on the post-separation side 11B of the membrane hydrogen separator 11 are known, it is possible to calculate the hydrogen partial pressure P2h from the above equation The concentration of hydrogen is detected by the hydrogen sensor 40 and the absolute pressure P2a is detected by the pressure sensor 44.

The ratio of N2, CO and $CO_2$ in air is fixed and may be regarded as a constant. Since steam in the anode effluent recirculation passage 8 may be considered to be saturated due to the action of the steam separator 14, the steam concentration B may also be regarded as a constant.

Thus instead of detecting the hydrogen concentration in the anode effluent recirculation passage 8 with a hydrogen sensor 40, it is possible to calculate the hydrogen partial pressure P2h on the post-separation side 11B of the membrane hydrogen separator 11 by detecting the concentration A of nitrogen ($N_2$) by providing a nitrogen sensor (40A) in the anode effluent recirculation passage 8. Since only a slight concentration of carbon monoxide (CO) and carbon dioxide ($CO_2$) exists in air, the calculation may be simplified by omitting the concentration $$\left( \frac{A \cdot Y}{X} + \frac{A \cdot Z}{X} \right)$$

of CO and $CO_2$ from the above equation.

Furthermore instead of providing a nitrogen sensor (40A), it is possible to calculate the hydrogen partial pressure P2h on the post-separation side 11B of the membrane hydrogen separator 11 by providing a carbon monoxide sensor (40B) in the anode effluent recirculation passage 8 in order to detect the concentration $$\frac{A \cdot Y}{X}$$

of carbon monoxide (CO).

Again instead of providing a nitrogen sensor (40A), it is possible to calculate the hydrogen partial pressure P2h on the post-separation side 11B of the membrane hydrogen separator 11 by providing a carbon dioxide sensor (40C) in the anode effluent recirculation passage 8 in order to detect the concentration $$\frac{A \cdot Z}{X}$$

of carbon dioxide ($CO_2$)

A control routine for the hydrogen partial pressure on the post-separation side 11B of the membrane hydrogen separator 11 which is executed by the controller 10 using the above algorithm will be described below. This routine is executed at intervals of ten milliseconds.

Figure 5:
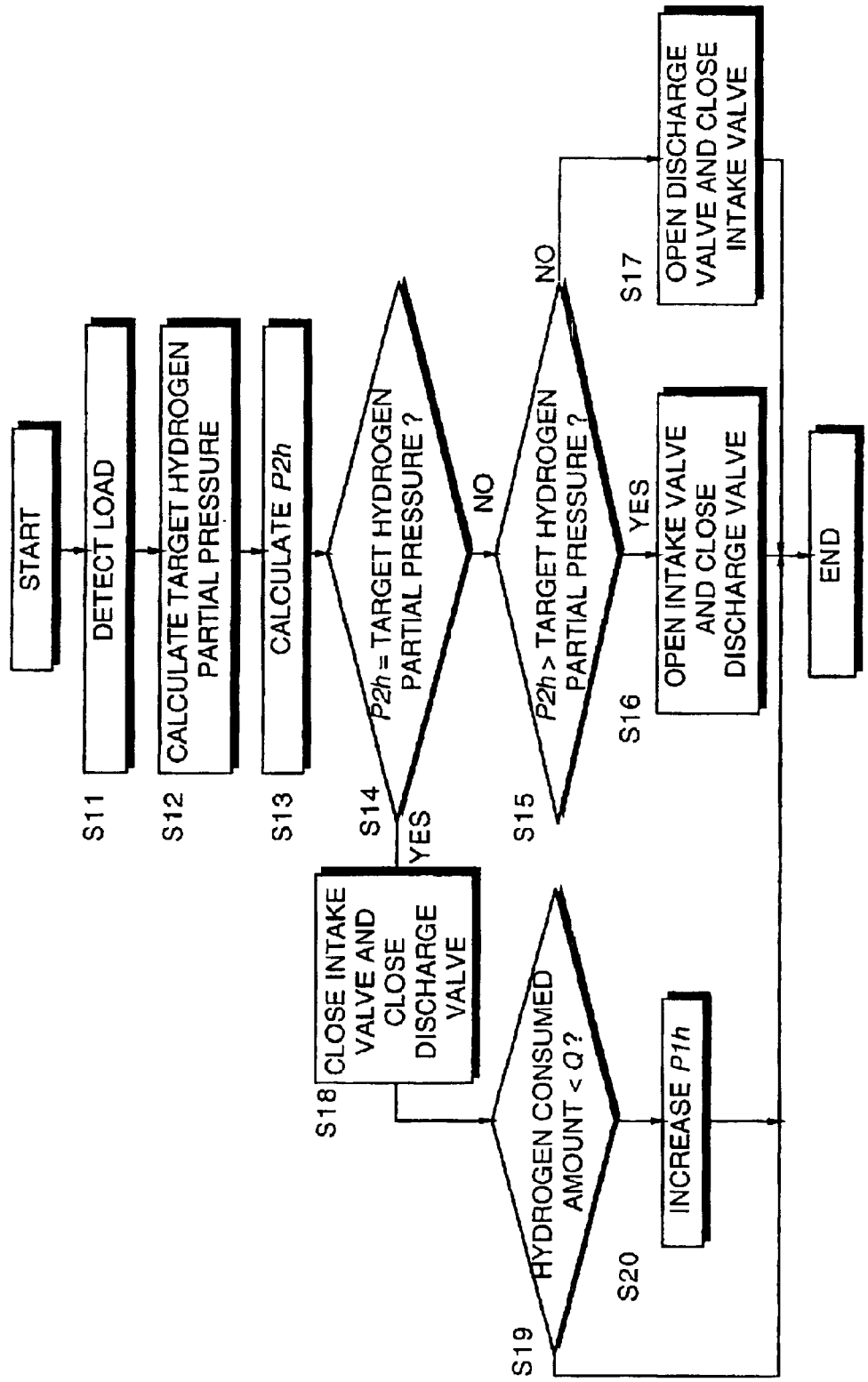
FIG. 5 is a flowchart describing a control routine of the hydrogen partial pressure on a post-separation side of a membrane hydrogen separator according to a fourth embodiment of this invention.

In a step S11 shown in FIG. 5, a load on the fuel cell stack 2 is detected by the controller 10. The load can be detected for example from the signals from a controller which controls a load circuit such as a motor.

Next in a step S12, a target hydrogen partial pressure is calculated in response to the load. The target hydrogen partial pressure is set to a value of a certain width for the convenience of control.

Basic concepts concerning the relationship of the target hydrogen partial pressure and the load on the fuel cell stack 2 are described below.

In this fuel cell power plant, the hydrogen partial pressure on the post-separation side 11B of the membrane hydrogen separator 11 is reduced by introducing air into the anode effluent recirculation passage 8 from the intake valve 30. A part of the gas in the anode effluent recirculation passage 8 is discharged from the discharge valve 60. As a result, the hydrogen partial pressure on the post-separation side 11B of the membrane hydrogen separator 11 can be increased. Thus the operation of reducing the hydrogen partial pressure results in increases in the gas flow amount of the anode effluent recirculation passage 8. Conversely the operation of increasing the hydrogen partial pressure results in reductions in the gas flow amount of the anode effluent recirculation passage 8.

An optimal hydrogen pressure on the post-separation side 11B of the membrane hydrogen separator 11 is taken to be a set pressure with respect to the designed load of the fuel cell stack 2. When the load on the fuel cell stack 2 is equal to the designed load, a target value for the hydrogen pressure on the post-separation side 11B of the membrane hydrogen separator 11 is set to be equal to the set pressure. In this case, the membrane hydrogen separator 11 separates hydrogen at an optimal efficiency.

In a low load region wherein the load on the fuel cell stack is less than the designed load, it is possible to maintain a required hydrogen amount even when the amount of hydrogen permeating the membrane hydrogen separator 11 is low. In order to maintain energy consumption of the recirculation pump 9 to low levels, it is necessary to reduce the flow amount of gas in the anode effluent recirculation passage 8.

Thus when the load on the fuel cell stack 2 is less than the designed load, a target value for the hydrogen pressure is set to be much larger than the set pressure as the load decreases. In this case, the hydrogen permeation amount in the membrane hydrogen separator 11 is low and the gas flow amount in the anode effluent recirculation passage 8 is also low.

In a high load region wherein the load on the fuel cell stack 2 is greater than the designed load, it is necessary to increase the hydrogen permeation amount through the membrane hydrogen separator 11. However there is an upper limit on the gas flow amount in the anode effluent recirculation passage 8 as a result of the capacity of the recirculation pump 9. If air is introduced into the anode effluent recirculation passage 8 from the intake valve 30 so as to reduce the hydrogen pressure on the post-separation side 11B of the membrane hydrogen separator 11, the total gas flow amount may exceed the upper limit in the anode effluent recirculation passage 8.

The flow amount of gas in the anode effluent recirculation passage 8 is therefore adapted not to exceed the upper limit by setting the target value for the hydrogen pressure on the post-separation side 11B of the membrane hydrogen separator 11 to be larger than the set pressure.

As a result, the rate of hydrogen permeation of the membrane hydrogen separator 11 is reduced than when the hydrogen pressure is equal to the set pressure. To satisfy the requirement on the hydrogen permeation amount of the membrane hydrogen separator 11, the hydrogen pressure on the pre-separation side 11A of the membrane hydrogen separator 11 is increased. The pressure on the pre-separation side 11A of the membrane hydrogen separator 11 is increased by increasing the amount of reformate gas produced in the reformer 4 by increasing the fuel supply amount from the fuel tank 5 to the vaporizer 3.

The target value for the hydrogen partial pressure when the load on the fuel cell stack 2 is greater than the designed load is set as follows.

The amount of hydrogen required by the fuel cell stack 2 is calculated based on the load, and a target flow amount in the anode effluent recirculation passage 8 is determined in consideration of the maximum flow amount of the recirculation pump 9. A target value for the hydrogen partial pressure is determined from the target flow amount in the anode effluent recirculation passage 8 and the required amount of hydrogen.

As can be understood from the above explanation, the target hydrogen partial pressure is set to be larger than the set pressure not only when the load on the fuel cell stack 2 is smaller than the designed load, but also when it is larger than the designed load. It is set to be equal to the set pressure only when the load on the fuel cell stack 2 is equal to the designed load.

Next in a step S13, the actual hydrogen partial pressure $P2h$ on the post-separation side 11B of the membrane hydrogen separator 11 is calculated from the concentration of hydrogen detected by the hydrogen sensor 40.

In a next step S14, it is determined whether or not the actual hydrogen partial pressure is equal to the target value for hydrogen partial pressure. When the actual partial pressure of hydrogen is equal to the target value, both the intake valve 30 and the discharge valve 60 are closed in a step S18 and the routine proceeds to a step S19.

In the step S19, it is determined whether or not a consumed amount of hydrogen is greater than the hydrogen permeation amount Q through the membrane hydrogen separator 11. The consumed amount of hydrogen is calculated from the load on the fuel cell stack 2. When the fuel cell stack 2 is used for driving a synchronous electric motor, it is possible to detect the load from a signal in a control circuit of an inverter of the synchronous electric motor. The amount of consumed hydrogen increases as the load increases.

The amount of hydrogen permeation Q is proportional to the difference of the square root of the hydrogen partial pressure on the pre-separation side 11A and the square root of the hydrogen partial pressure on the post-separation side 11B of the membrane hydrogen separator 11. The hydrogen partial pressure on the post-separation side 11B is calculated from the hydrogen concentration detected by the hydrogen sensor 40 as described hereinbefore.

The hydrogen partial pressure on the pre-separation side 11A of the membrane hydrogen separator 11 is calculated as follows.

When the steam reformer 4 reforms methanol, hydrogen ($H_2$), carbon dioxide ($CO_2$), carbon monoxide (CO), and water ($H_2O$) are contained in the reformate gas. When the steam reformer 4 is operated in a fixed state, the ratio of these components is fixed. Thus it is possible to regard them as a constant in order to predict the hydrogen concentration in the reformate gas. The absolute pressure $P1a$ on the pre-separation side 11A of the membrane hydrogen separator 11 is detected by the pressure sensor 45. The hydrogen partial pressure P1$h$ on the pre-separation side 11A of the membrane hydrogen separator 11 is calculated from the following equation using these values.

P1$h$=P1$a$·hydrogen concentration

Naturally, it is possible to detect the concentration of hydrogen on the pre-separation side 11A of the membrane hydrogen separator 11 with a hydrogen sensor instead of regarding it as a constant.

On the other hand, the permeation amount of hydrogen Q0 under predetermined conditions on the membrane hydrogen separator 11 is calculated experimentally. The hydrogen partial pressure on the pre-separation side 11A at this time is taken to be P1$h$0 and the hydrogen partial pressure on the post-separation side 11B is taken to be P2$h$0. This data is used in the following equation to calculate the permeation amount of hydrogen Q.

$$Q = Q0 \cdot \frac{\sqrt{P1h} - \sqrt{P2h}}{\sqrt{P1h0} - \sqrt{P2h0}}$$

When the amount of consumed hydrogen in the step S19 is not greater than the hydrogen permeation amount, it is understood that the hydrogen supply is sufficient. In this case, the routine is immediately terminated.

On the other hand, when the amount of consumed hydrogen is greater than the hydrogen permeation amount, it is understood that the hydrogen supply is insufficient. In this case, the hydrogen partial pressure P1$h$ on the pre-separation side 11A of the membrane hydrogen separator 11 in the step S20 is increased in order to increase the hydrogen permeation amount. As shown above, this is performed by increasing the fuel supply amount from the fuel tank 5 to the vaporizer 3. After the controller 10 performs the step S20, the routine is terminated.

In the step S14, when the actual hydrogen partial pressure on the post-separation side 11B of the membrane hydrogen separator 11 is not equal to the target hydrogen partial pressure, in a step S15, the controller 10 determines whether or not the actual hydrogen partial pressure is greater than the target hydrogen partial pressure. When the actual hydrogen partial pressure is greater than the target hydrogen partial pressure, in a step S16, the intake valve 30 is opened and the discharge valve 60 is closed. After performing this operation, the routine is terminated.

When the actual hydrogen partial pressure is not greater than the target hydrogen partial pressure, in a step S17, the intake valve 30 is closed and the discharge valve 60 is opened. After performing this operation, the routine is terminated.

When the air is introduced into the anode effluent recirculation passage 8 by opening the intake valve 30, it is not possible to accurately calculate the hydrogen partial pressure until the oxygen in the air is consumed by oxidation reactions in the fuel cell stack 2. Heat of oxidation is generated when oxygen in the air introduced into the anode effluent recirculation passage 8 undergoes oxidation reactions in the anode chamber 2A. The opening of the intake valve 30 must be controlled so that oxygen introduced into the anode effluent recirculation passage 8 is completely consumed in the fuel cell stack 2 and the heat resulting from the oxidation processes does not exceed the heat tolerance of the fuel cell stack 2.

During control of the intake valve 30, it is preferred that the introduced amount of air during a single execution of the routine is a fixed amount. Oxygen in the air should be consumed by oxidation reactions and steam generated by these oxidation reactions should be removed by the water separator 14 before a subsequent occasion the routine is executed. The steam concentration in the gas in the anode effluent recirculation passage 8 should also be maintained at the saturation level. The fixed amount is preferably determined to satisfy the above conditions.

The contents of Tokugan 2000-275190, with a filing date of Sep. 11, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A fuel cell power plant comprising:
   a fuel cell stack comprising an anode chamber and a cathode chamber, the fuel cell stack generating power by a reaction of hydrogen supplied to the anode chamber and air supplied to the cathode chamber;
   a membrane hydrogen separator having a pre-separation side facing a reformate gas and a post-separation side, the membrane hydrogen separator allows hydrogen in the reformate gas to permeate from the pre-separation side to the post-separation side;
   a hydrogen supply passage which supplies hydrogen at the post-separation side of the membrane hydrogen separator to the anode chamber;
   an anode effluent recirculation passage which recirculates anode effluent discharged from the anode chamber to the post-separation side of the membrane hydrogen separator;
   an intake valve which introduces part of the air supplied to the cathode chamber to the anode effluent recirculation passage; and
   a discharge valve which discharges gas from the anode effluent recirculation passage.

2. The fuel cell power plant as defined in claim 1, wherein the fuel cell power plant further comprises a sensor which detects a hydrogen partial pressure on the post-separation side of the membrane hydrogen separator, and a controller functioning to open the intake valve while closing the discharge valve when the hydrogen partial pressure is higher than a predetermined pressure, and open the discharge valve while closing the intake valve when the hydrogen partial pressure is lower than the predetermined pressure.

3. The fuel cell power plant as defined in claim 2, wherein the the sensor comprises a sensor which detects a hydrogen concentration on the post-separation side of the membrane hydrogen separator and a sensor which detects an absolute pressure on the post-separation side of the membrane hydrogen separator, and the controller further functions to calculate the hydrogen partial pressure on the post-separation side of the membrane hydrogen separator by multiplying the hydrogen concentration by the absolute pressure.

4. The fuel cell power plant as defined in claim 1 wherein the fuel cell power plant further comprises a sensor which detects an absolute pressure on the post-separation side of the membrane hydrogen separator and a sensor which detects a gas concentration of any of nitrogen, carbon monoxide and carbon dioxide in the anode effluent recirculation passage, and a controller functioning to calculate a hydrogen partial pressure on the post-separation side of the membrane hydrogen separator based on the gas concentration, a composition of air, and the absolute pressure, open the intake valve while closing the discharge valve when the hydrogen partial pressure is higher than a predetermined pressure region, and open the discharge valve while closing the intake valve when the hydrogen partial pressure is lower than the predetermined pressure region.

5. The fuel cell power plant as defined in claim 4, wherein the fuel cell power plant further comprises a mechanism which supplies the reformate gas to the pre-separation side of the membrane hydrogen separator and a sensor which detects a hydrogen partial pressure on the pre-separation side of the membrane hydrogen separator, and the controller further functions to close the discharge valve and the intake valve when the hydrogen partial pressure on the post-separation side of the membrane hydrogen separator is in the predetermined pressure region, calculates a hydrogen permeation amount through the membrane hydrogen separator from the hydrogen partial pressure on the post-separation side and the hydrogen partial pressure on the pre-separation side, and control the reformate gas supply mechanism to increase the reformate gas when the hydrogen permeation amount is smaller than a predetermined amount.

6. A fuel cell power plant comprising:
   a fuel cell stack comprising an anode chamber and a cathode chamber, the fuel cell stack generating power by a reaction of hydrogen supplied to the anode chamber and air supplied to the cathode chamber;
   a membrane hydrogen separator having a pre-separation side facing a reformate gas and a post-separation side, the membrane hydrogen separator allows hydrogen in the reformate gas to permeate from the pre-separation side to the post-separation side;
   a hydrogen supply passage which supplies hydrogen at the post-separation side of the membrane hydrogen separator to the anode chamber;
   an anode effluent recirculation passage which recirculates anode effluent discharged from the anode chamber to the post-separation side of the membrane hydrogen separator;
   a combustor which combusts the reformate gas;
   an intake valve which introduces combusted gas from the combustor into the hydrogen supply passage; and
   a discharge valve which discharges gas from the anode effluent recirculation passage.

7. The fuel cell power plant as defined in claim 6, wherein the fuel cell power plant further comprises a sensor which detects a hydrogen partial pressure on the post-separation side of the membrane hydrogen separator, and a controller functioning to open the intake valve while closing the discharge valve when the hydrogen partial pressure is higher than a predetermined pressure, and open the discharge valve while closing the intake valve when the hydrogen partial pressure is lower than the predetermined pressure.

8. The fuel cell power plant as defined in claim 7, wherein the sensor comprises a sensor which detects a hydrogen concentration on the post-separation side of the membrane hydrogen separator and a sensor which detects an absolute pressure on the post-separation side of the membrane hydrogen separator, and the controller is further functioning to calculate the hydrogen partial pressure on the post-separation side of the membrane hydrogen separator by multiplying the hydrogen concentration by the absolute pressure.

9. A fuel cell power plant comprising:
   a fuel cell stack comprising an anode chamber and a cathode chamber, the fuel cell stack generating power by a reaction of hydrogen supplied to the anode chamber and air supplied to the cathode chamber;
   a membrane hydrogen separator having a pre-separation side facing a reformate gas and a post-separation side, the membrane hydrogen separator allows hydrogen in the reformate gas to permeate from the pre-separation side to the post-separation side;
   a hydrogen supply passage which supplies hydrogen at the post-separation side of the membrane hydrogen separator to the anode chamber;
   an anode effluent recirculation passage which recirculates anode effluent discharged from the anode chamber to the post-separation side of the membrane hydrogen separator;
   an intake valve which introduces part of a cathode effluent discharged from the cathode chamber to the anode effluent recirculation passage; and
   a discharge valve which discharges gas from the anode effluent recirculation passage.

10. The fuel cell power plant as defined in claim 9, wherein the fuel cell power plant further comprises a sensor which detects a hydrogen partial pressure on the post-separation side of the membrane hydrogen separator, and a controller functioning to open the intake valve while closing the discharge valve when the hydrogen partial pressure is higher than a predetermined pressure, and open the discharge valve while closing the intake valve when the hydrogen partial pressure is lower than the predetermined pressure.

11. The fuel cell power plant as defined in claim 10, wherein the sensor comprises a sensor which detects a hydrogen concentration on the post-separation side of the membrane hydrogen separator and a sensor which detects an absolute pressure on the post-separation side of the membrane hydrogen separator, and the controller further functions to calculate the hydrogen partial pressure on the post-separation side of the membrane hydrogen separator by multiplying the hydrogen concentration by the absolute pressure.

* * * * *